United States Patent
Andersson

(10) Patent No.: US 6,431,609 B1
(45) Date of Patent: Aug. 13, 2002

(54) PIPE CONNECTION FOR VENTILATING DUCT SYSTEM

(75) Inventor: Pontus Andersson, Ängelholm (SE)

(73) Assignee: Lindab AB, Bastad (SE)

( * ) Notice: Subject to any disclaimer, the term of this patent is extended or adjusted under 35 U.S.C. 154(b) by 0 days.

(21) Appl. No.: 09/533,768

(22) Filed: Mar. 23, 2000

(30) Foreign Application Priority Data

Mar. 24, 1999 (SE) .............................................. 9901073

(51) Int. Cl.$^7$ ................................................ F16L 35/00
(52) U.S. Cl. ...................... 285/24; 285/424; 285/332.2; 285/332.3
(58) Field of Search .......................... 285/24, 424, 374, 285/332.2, 332.3

(56) References Cited

U.S. PATENT DOCUMENTS

| | | |
|---|---|---|
| 3,955,834 A | 5/1976 | Ahlrot |
| 4,050,703 A | 9/1977 | Tuvesson et al. |
| 4,216,981 A * | 8/1980 | Jensen .......................... 285/110 |
| 4,850,621 A | 7/1989 | Umehara |
| 5,473,815 A * | 12/1995 | Sonden et al. .......... 29/890.149 |
| 5,531,460 A | 7/1996 | Stefansson et al. |
| 6,170,883 B1 * | 1/2001 | Mattsson et al. ........... 285/110 |

FOREIGN PATENT DOCUMENTS

| | | |
|---|---|---|
| DE | A-2840962 | 4/1979 |
| DE | A-2559652 | 10/1979 |
| EP | B-596230 | 12/1996 |
| FI | A-851097 | 9/1986 |
| SE | CH 646 233 | 11/1984 |
| WO | WO 94/15133 | 7/1994 |

OTHER PUBLICATIONS

"Ventilation for buildings—Sheet metal air ducts and fittings with circular cross–section—Dimensions" issued in 11/98 by Swedish Institute for Standards, Stockholm, Sweden.
"Ventilation–92" catalog issued in 1992 by Lindab AB.
"Ventilation" issued in 1985 by Lindab AB.
"Ventilation 95" issued in 1995 by Lindab AB.

\* cited by examiner

*Primary Examiner*—Lynne H. Browne
*Assistant Examiner*—Kenn Thompson
(74) *Attorney, Agent, or Firm*—Weingarten, Schurgin, Gagnebin & Lebovici LLP

(57) ABSTRACT

A pipe connection for use in a ventilating duct system having ducts with circular cross-section is adapted to be inserted with a close fit into an outer pipe and be connected therewith. The pipe connection has a circumferential groove, in which a circumferential seal sealing against the inside of the outer pipe is arranged. A terminal edge portion of the pipe connection comprises an outer conical portion which has a diameter decreasing towards the end of the pipe connection, and a circumferential guide surface having such a diameter that said close fit is obtained. The axial length (L3) of the terminal edge portion constitutes about 1.5–5.5% of the diameter of the guide surface. The outer conical portion at its end has a diameter which constitutes about 97–99.9% of the diameter of the guide surface.

20 Claims, 2 Drawing Sheets

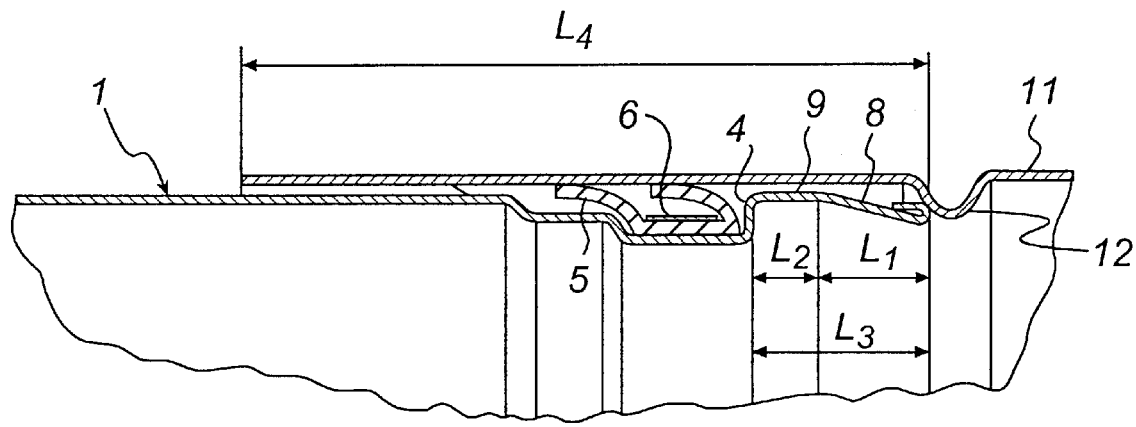
Fig. 3
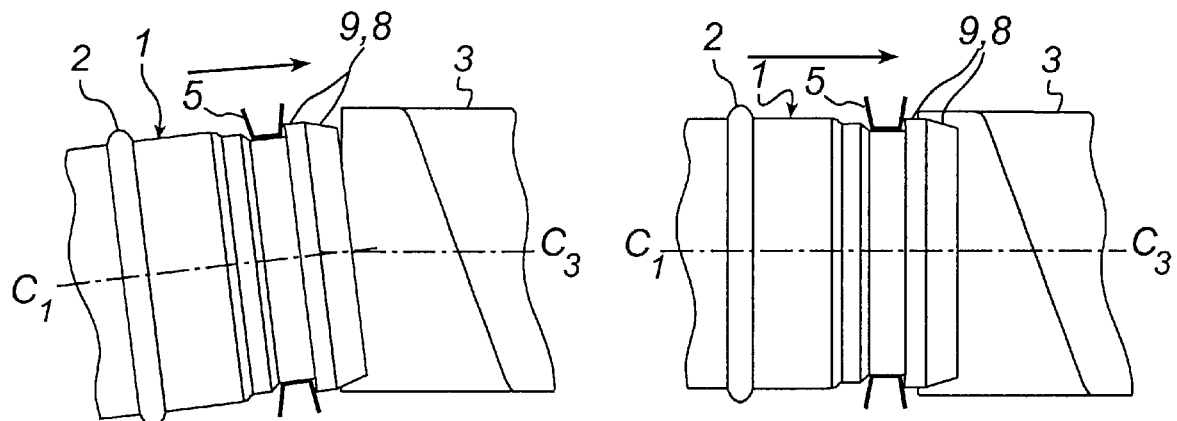
Fig. 4
Fig. 6
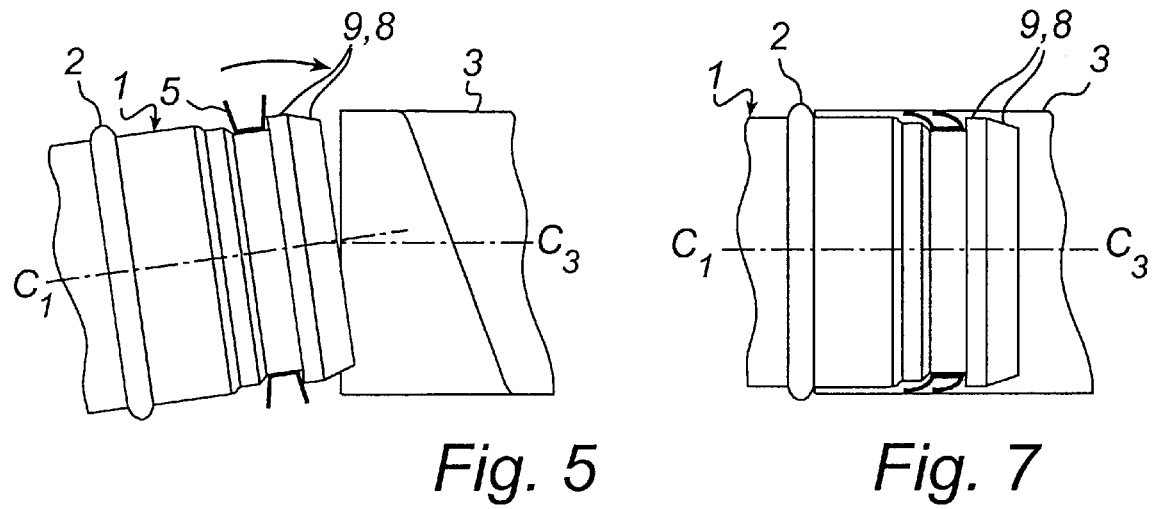
Fig. 5
Fig. 7

PIPE CONNECTION FOR VENTILATING DUCT SYSTEM

FIELD OF THE INVENTION

The present invention relates to a pipe connection for use in a ventilating duct system having ducts with circular cross-section.

BACKGROUND ART

In ventilating duct systems, use is made of different pipe connections for connecting and branching the system. Such pipe connections are often called "pipe fittings" by those skilled in the art. Pipe fittings of this type are shown, for instance, in the catalogue "Ventilation—92" issued by Lindab AB in 1992. Moreover, pipe fittings are described in an SIS document called SS-EN 1506 and issued in November 1998, entitled (in English) "Ventilation for buildings—Sheet metal air ducts and fittings with circular cross-section—Dimensions".

In a method of joining a pipe fitting with a ventilating pipe, the end portion of the fitting is inserted into the pipe, a sealing ring mounted at the end of the fitting ensuring the seal of the pipe joint. This is illustrated on the page "Safe 5" in the above-mentioned Lindab catalogue. Similar pipe fittings with a sealing ring are shown in the FIG. A.1(d) and FIG. A.3(c) in the above-mentioned SIS document.

Further examples of pipe connections of this type are described in CH-A-646,233 and in U.S. Pat. No. 4,050,703 and WO 94/15133. A common feature of these prior-art pipe connections is that the sealing ring is arranged in a circumferential groove adjacent to the end of the pipe fitting. U.S. Pat. No. 3,955,834 also belongs to prior art and discloses similar pipe connections and sealing constructions, including embodiments in which the sealing ring is clamped in the end of the pipe fitting by the terminal edge thereof being bent radially outwards/backwards.

The nominal diameter of ventilating ducts and pipe fittings of this type is according to standard between 63 mm and 1,250 mm (see Table 1 in the SIS document). As a rule, the sealing ring of the pipe fittings is placed close to the end of the fitting independently of the nominal diameter. This causes certain mounting problems especially for diameters exceeding 630 mm, as will be explained in more detail below.

When a pipe fitting having a greater diameter is to be connected to a ventilating pipe, the fitting is slightly inclined when being inserted into the pipe. In technical language, the fitting is made to enter. During such entering, first an outer circumferential portion of the end of the fitting is placed on an inner circumferential portion of the outer tube at the end thereof. Then the fitting is turned to a position coaxially with the pipe and is finally inserted into the same.

In connection with greater diameters, the ventilating pipes made of thin sheet metal are somewhat oval at the end, which means that the entering operation will be complicated. It is in fact difficult to insert the inclined pipe fitting to such an extent that the entering can be carried out. The pipe ends quite simply do not fit together. Since the distance between the end of the pipe fitting and the groove in which the sealing ring is arranged is comparatively small, the so-called entering edge of the fitting is too small to be able to efficiently remodel the oval shape of the outer pipe. By entering edge is here meant the distance between the end of the pipe fitting and the groove where the sealing ring is arranged. In prior-art pipe fittings with a folded terminal edge, the axial length of the entering edge usually constitutes about 1% of the diameter of the fitting.

Another drawback that arises during entering is that the circumferential portion of the pipe fitting which is first placed on the inside of the outer pipe easily "jumps out of" the pipe when the fitting is to be turned in place for insertion.

A further inconvenience is that the lips of the sealing ring are easily folded in the wrong direction in the final part of the entering operation, which may cause insufficient sealing action and undesirable pressure drop in the duct, which in turn causes noise and increased energy costs.

SUMMARY OF THE INVENTION

An object of the present invention is to obviate the above drawbacks and provide a pipe connection which is improved relative to prior art.

According to the invention, this and other objects that will appear from the following specification are now achieved by a pipe connection for use in a ventilating duct system having ducts with circular cross-section, the pipe connection being adapted to be partially and with a close fit inserted into and connected with an outer pipe, the pipe connection having a circumferential groove, in which a circumferential seal is arranged, which in an inserted position of the pipe connection abuts and seals against an inside of the outer pipe, the pipe connection having a terminal edge portion which is adapted to be inserted into the outer pipe and which comprises an outer conical portion with a diameter decreasing towards an end of the pipe connection. The terminal edge portion of the pipe connection further comprises a circumferential guide surface which has such a diameter that the close fit is obtained and which is located between the groove and the conical outer portion, and the terminal edge portion has an axial length which constitutes about 1.5–5.5% of the diameter of the guide surface.

By the terminal edge portion of the pipe connection, i.e. the portion between the end of the pipe connection and the groove in which the sealing ring is arranged (the entering edge), being formed with a greater axial extent than in prior-art pipe connections, the inventive pipe connection will have a longer end portion which during entering is inserted into the outer pipe. As a result, the pipe connection can be inserted more easily also into somewhat oval outer pipes, and the pipe connection is kept in the pipe during the turning that takes place during entering. Since the sealing ring is arranged axially further inwards on the pipe connection, it will be positioned outside the outer pipe during the entire entering operation, which means that there is no risk of its sealing lips being folded in the wrong direction towards the inside of the outer tube. The risk of pressure drop and leakage in the pipe joint is thus reduced.

Altogether this means that the inventive pipe connection is more mounting-friendly than prior art pipe connections. In particular, the mounting staff need not use such mounting aids as have up to now been necessary owing to the oval shape of the larger ventilating pipes.

The entering of the pipe connection is facilitated by its outer conical portion which has a diameter decreasing towards the end of the pipe connection. Certain degrees of conicity have been found particularly advantageous. In a preferred embodiment, the conical portion has at its end a diameter which is about 97–99.9% of the diameter of the guide surface, preferably about 98%.

The combination of the suggested axial length of the terminal edge portion (1.5–5.5% of the diameter of the guide surface) and the above-mentioned conditions for conicity, i.e. the diameter of the conical portion at the end of the pipe connection, results in a very advantageous embodiment which means a considerably improved mounting.

The terminal edge portion or entering edge of the pipe connection comprises the outer conical portion and the neighboring guide surface which is arranged axially inwardly thereof. The axial length ratio of these two portions of the entering edge preferably has a certain distribution. The entering operation is most effective if the conical portion constitutes about 40–70% of the total axial length of the entering edge. Most preferred the range is 50–65%, and in particular the value 55% is advantageous.

According to an additional preferred embodiment, the pipe connection has a further guide surface positioned axially inside the groove in which the sealing ring is arranged. This additional guide surface preferably has the same diameter as the guide surface of the entering edge. As a result, the pipe joint will be more stable and straight compared with prior-art technique, which is due to the fact that the outer pipe rests with a close fit against two guide surfaces on each side of the groove.

BRIEF DESCRIPTION OF THE DRAWINGS

The invention and its many advantages will be described in more detail below with reference to the accompanying drawings which illustrate currently preferred embodiments.

FIG. 3 is a view similar to FIG. 1 and shows an alternative embodiment of the pipe connection.

FIGS. 4–7 show how the pipe connection illustrated in FIG. 1 is inserted into and connected with an outer pipe, thereby forming a pipe joint.

DESCRIPTION OF EMBODIMENTS

Figure 1:
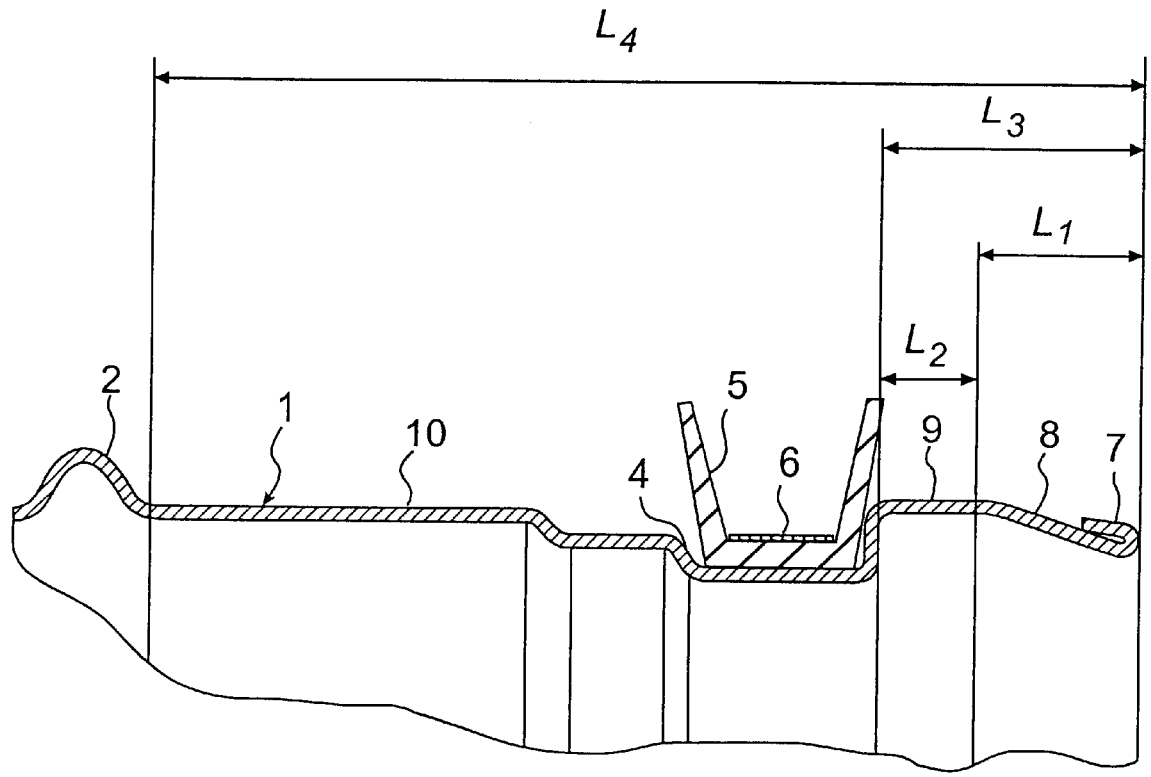
FIG. 1 is a partial axial section through a wall of a pipe connection according to an embodiment of the invention.

FIG. 1 shows a portion of a cylindrical pipe connection or tubular element according to an embodiment of the invention, which is generally designated 1. In the Example, the pipe connection 1 is a special pipe fitting, viz. a so-called nipple which is symmetrical along a circumferential bead 2 and which is adapted to connect two outer cylindrical ventilating pipes with each other. (Only the right-hand part of the nipple is shown in FIG. 1.) Such an outer pipe 3 is shown in FIGS. 4–7.

The pipe connection 1, which is made of thin sheet metal, has a circumferential groove 4 in which a circumferential sealing ring 5 is arranged. In the shown Example, the sealing ring 5 is a double lip seal of rubber, which is clamped in the groove 4 by means of a strap 6. As illustrated in FIG. 1, the double lip seal 5 is U shaped in cross-section and has a web portion placed in the bottom of the groove 4 and two sealing lips extending substantially radially outwards from the web portion. The edge 7 of the pipe connection 1 is at the end bent in a per se known manner radially outwards/rear backwards with a view to stiffening the end of the pipe connection 1.

The pipe connection 1 has at its end a conical portion 8 with an axial length L1 and, axially inside the same, a neighboring, circumferential guide surface 9 with an axial length L2. The conical portion 8 and the guide surface 1 together form a terminal edge portion or, in technical language, an entering edge with an axial length L3. The length of the so-called insert portion, i.e. the axial distance on which the pipe connection 1 is over-lapped by the outer pipe 3 after being connected (cf. FIG. 7), is marked L4. This insert portion length L4 is thus measured between the end of the pipe connection 1 and the abutment surface of the bead 2.

In addition to the guide surface 9 which belongs to the entering edge 8, 9, the pipe connection 1 has an additional circumferential guide surface 10 axially inside the groove 4. The guide surfaces 9 and 10 contribute to establishing the close fit to the outer pipe 3. Preferably, the guide surfaces 9 and 10 have the same diameter.

Figure 2:
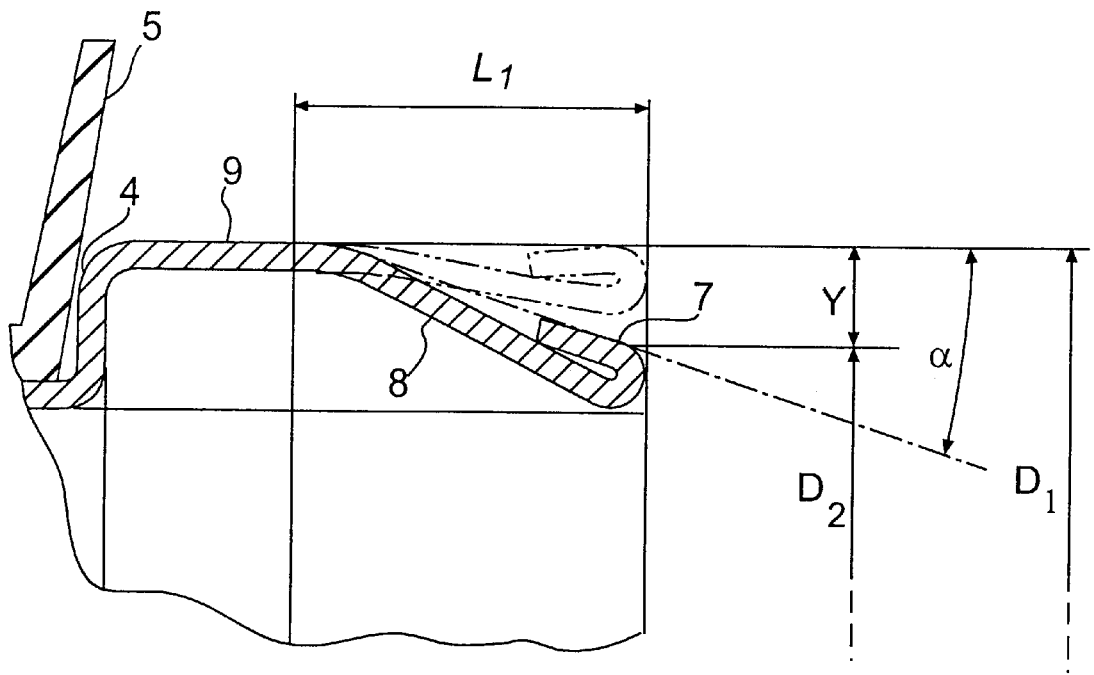
FIG. 2 illustrates on a larger scale and in cross-section an outer conical portion of a pipe connection according to FIG. 1.

FIG. 2 shows a partial section of the terminal edge portion 8, 9 of the pipe connection 1, where the cone angle $\alpha$ of the conical portion 8 is marked. With a maximum cone angle $\alpha$, i.e. about 25°, the inside of the bent part 7 of the conical portion 8 is on a level with the depth of the groove 4. The outside of the bent part 7 of the conical portion 8 is, with this cone angle, at its maximum distance Y from a generatrix to the guide surface 9. The diameter of the conical portion 8 measured in this position is D2, which is always smaller than the diameter D1 of the guide surface 9.

The smallest cone angle $\alpha$ is about 2°, which is schematically indicated by dashed lines in FIG. 2. In the Figure, the smallest cone angle $\alpha$ appears to be 0°, but in practice the cone angle $\alpha$ must be at least 2°.

In the typical case, the cone angle is 2–12° for the diameter range 710–900 mm and 4–15° for the diameter range 1,000–1,250 mm.

For an improved entering operation, the pipe connection 1 is designed in such manner that the axial length L3 of the terminal edge portion 8, 9 is 1.5–5.5% of the diameter D1 of the guide surface 9, preferably in the range 2–5%. Practical experiments have produced excellent results, which are shown in the Table below.

| Diameter D1 (mm) | Entering Edge L3 (mm) | Ratio (%) |
|---|---|---|
| 710 | 26.0 | 3.7 |
| 800 | 26.0 | 3.2 |
| 900 | 26.0 | 2.9 |
| 1000 | 31.0 | 3.1 |
| 1120 | 31.0 | 2.8 |
| 1250 | 31.0 | 2.5 |

It has also been found that the entering operation function in a highly reliable manner if the diameter D2 of the conical portion 8 at the end is 97–99.9% of the diameter D1 of the guide surface 9, the latter diameter corresponding to the nominal diameter. Preferably, said diameter ratio is about 98%.

The practical experiments have also proved that good results are achieved if the axial length L1 of the conical portion is 40–70% of the axial length L3 of the terminal edge portion 8, 9. Preferably the ratio is in the range 50–65%, and most advantageously about 55%. By selecting a suitable length ratio while taking these conditions into consideration, the entering edge can be optimized according to the current conditions of the pipe joint.

FIG. 3 illustrates a variant in which the pipe connection 1 is inserted into an outer pipe in the form of a sleeve 11 with an internal, circumferential bead 12. In this case the insert portion length L4 will be the same as before.

A common feature of the embodiments according to FIGS. 1 and 3 is that the axial length L3 of the terminal edge portion 8, 9 is 10–60% of the insert portion length L4, preferably 20–30% and most advantageously about 25%. It has also been found advantageous to design the pipe connection 1 in such manner that the insert portion length L4 is 9–15% of the diameter D1 of the guide surfaces 9, 10.

FIGS. 4–7 illustrate how a pipe connection 1 designed according to the invention is partially inserted into and connected with a close fit with a ventilating pipe 3. First the lower circumferential portion of the pipe connection 1 is placed on the inside of the pipe 3 (FIG. 4). Thanks to the relatively large entering edge 8, 9 with its conical portion 8, the pipe connection 1 is retained in the pipe 3 during the subsequent step which involves a turning motion (FIG. 5). The sealing ring 5 is all the time kept outside the pipe 3 and thus cannot be turned or inclined in any undesirable fashion. The connecting operation may then continue in the axial direction (FIG. 6) and be completed (FIG. 7).

As is evident from FIGS. 4–7, the center axis C1 of the pipe connection 1 and the center axis C3 of the pipe 3 in the joining operation first form an angle with each other and then coincide in the axial direction (coaxially).

According to one aspect of the invention it may be said that the axial length L3 of the terminal edge portion 8, 9 of the pipe connection 1 increases with an increased diameter range of the pipe connection 1. This would be applicable at least to standard dimensions.

Finally it should be mentioned that the invention is in no way limited to the embodiments which have been described above, and modifications are feasible within the scope of the inventive concept as expressed in the appended claims. In particular, it should be pointed out that the invention is applicable to many different types of pipe connections that are included in a ventilating duct system, such as connectors, nipples, T pipes, bends, reducers, terminal pieces etc. The conical portion need not have precisely the design as shown in the accompanying drawings; for instance, it should be mentioned that the bent end can be omitted (not shown) so that the conical portion will be completely flat on its outside (see, for example, the design "rak kant" (in English: straight edge) as shown in the center figure on the page Safe 5 in the Lindab catalogue mentioned by way of introduction).

What I claim and desire to secure by Letters Patent is:

1. A pipe connection for use in a ventilating duct system having ducts with circular cross-section, said pipe connection being adapted to be partially and with a close fit inserted into and connected with an outer pipe, said pipe connection having a circumferential groove, in which a circumferential seal is arranged, which in an inserted position of said pipe connection abuts and seals against an inside of said outer pipe, said pipe connection having a terminal edge portion which is adapted to be inserted into said outer pipe and which comprises an outer conical portion with a diameter decreasing towards an end of said pipe connection, wherein said terminal edge portion of said pipe connection further comprises a circumferential guide surface which has such a diameter that said close fit is obtained and which is located between said groove and said conical outer portion; said terminal edge portion having an axial length which constitutes about 1.5–5.5% of said diameter of said guide surface.

2. The pipe connection of claim 1, wherein said axial length of said terminal edge portion constitutes about 2–5% of said diameter of said guide surface, preferably about 2.5–3.7%.

3. The pipe connection of claim 1, wherein said outer conical portion at its end has a diameter which is about 97–99.9% of said diameter of said guide surface.

4. The pipe connection of claim 1, wherein said conical portion of said pipe connection has an axial length which is about 40–70% of said axial length of said terminal edge portion.

5. The pipe connection of claim 4, wherein said axial length of said conical portion of said pipe connection is about 50–65% of said axial length of said terminal edge portion, preferably about 55%.

6. The pipe connection of claim 1, wherein said conical portion has a cone angle which is in a range of 2–25°.

7. The pipe connection of claim 1, further comprising an additional circumferential guide surface which is located longitudinally away from said groove in respect of said end of said pipe connection, said additional guide surface having such a diameter that id close fit is obtained.

8. The pipe connection of claim 7, wherein said two circumferential guide surfaces have essentially the same diameter.

9. The pipe connection of claim 1, further comprising a circumferential, external bead, which in connection with said insertion forms an abutment for said end of said outer pipe, an axial distance between said end of said pipe connection and an abutment surface of said bead constituting an insert portion, and said axial length of said terminal edge portion constituting about 10–60% of said axial length of the insert portion.

10. The pipe connection of claim 1, further comprising a circumferential internal bead, which in connection with said insertion forms an abutment for an end of said pipe connection, an axial distance between said outer end of said outer pipe and an abutment surface of said bead constituting an insert portion, and said axial length of said terminal edge portion constituting about 10–60% of said axial length of said insert portion.

11. The pipe connection of claim 9, wherein said axial length of said terminal edge portion constitutes about 20–30% of said axial length of said insert portion, preferably about 25%.

12. The pipe connection of claim 9, wherein said axial length of said insert portion constitutes about 9–15% of said diameter of said guide surface or guide surfaces.

13. The pipe connection of claim 1, which consists of a connector with two terminal edge portions which are adapted to be inserted into and thus join two coaxially arranged outer pipes.

14. The pipe connection of claim 1, wherein said axial length of said terminal edge portion of said pipe connection increases with an increased diameter range of said pipe connection.

15. The pipe connection of claim 1, wherein said circumferential seal is a sealing ring being U shaped in cross-section with a web portion and two sealing lips.

16. A ventilating duct system having ducts of circular cross-section, and including one or more pipe connections of claim 1 sealed to respective inner edges of a duct pipe of said system.

17. A ventilating duct system, comprising pipe joints as claimed in claim 16.

18. The pipe connection of claim 10, wherein said axial length of said terminal edge portion constitutes about 20–30% of said axial length of said insert portion, preferably about 25%.

19. The pipe connection of claim 10, wherein said axial length of said insert portion constitutes about 9–15% of said diameter of said guide surface or guide surfaces.

20. The pipe connection of claim 11, wherein said axial length of said insert portion constitutes about 9–15% of said diameter of said guide surface or guide surfaces.

* * * * *

UNITED STATES PATENT AND TRADEMARK OFFICE
CERTIFICATE OF CORRECTION

PATENT NO. : 6,431,609 B1
DATED : August 13, 2002
INVENTOR(S) : Pontus Andersson It is certified that error appears in the above-identified patent and that said Letters Patent is hereby corrected as shown below:

<u>Title page,</u>
Item [30], Foreign Application Priority Data, "9901073" should read
-- 9901073-8 --; and <u>Column 6,</u>
Line 11, "id" should read -- said --.

Signed and Sealed this

Twenty-ninth Day of July, 2003

JAMES E. ROGAN
*Director of the United States Patent and Trademark Office*